US009251035B1

(12) United States Patent
Vazac et al.

(10) Patent No.: US 9,251,035 B1
(45) Date of Patent: Feb. 2, 2016

(54) LOAD TEST CHARTS WITH STANDARD DEVIATION AND PERCENTILE STATISTICS

(75) Inventors: Charles A. Vazac, San Francisco, CA (US); Tal Broda, Sunnyvale, CA (US); Michael Hemmert, Scotts Valley, CA (US); Mukul Sharma, Mountain View, CA (US)

(73) Assignee: SOASTA, Inc., Mountain View, CA (US)

( * ) Notice: Subject to any disclaimer, the term of this patent is extended or adjusted under 35 U.S.C. 154(b) by 132 days.

(21) Appl. No.: 13/369,899

(22) Filed: Feb. 9, 2012

Related U.S. Application Data

(63) Continuation-in-part of application No. 12/804,338, filed on Jul. 19, 2010.

(51) Int. Cl.
*G06F 11/34* (2006.01)

(52) U.S. Cl.
CPC .................................. *G06F 11/3466* (2013.01)

(58) Field of Classification Search
CPC .................... H04L 41/22; H04L 41/12; H04L 12/26–12/2697; H04L 43/00–43/50; G06F 11/30–11/3495
USPC ......................................................... 715/736
See application file for complete search history.

(56) References Cited

U.S. PATENT DOCUMENTS

| | | | |
|---|---|---|---|
| 5,414,809 A | 5/1995 | Hogan et al. | |
| 5,724,525 A | 3/1998 | Beyers et al. | |
| 5,945,986 A | 8/1999 | Bargar et al. | |
| 6,025,853 A | 2/2000 | Baldwin | |
| 6,092,043 A | 7/2000 | Squires et al. | |
| 6,134,582 A | 10/2000 | Kennedy | |
| 6,317,786 B1 | 11/2001 | Yamane et al. | |
| 6,434,513 B1 | 8/2002 | Sherman et al. | |
| 6,542,163 B2 | 4/2003 | Gorbet et al. | |
| 6,560,564 B2 | 5/2003 | Scarlat et al. | |
| 6,563,523 B1 | 5/2003 | Suchocki et al. | |
| 6,601,020 B1 | 7/2003 | Myers | |
| 6,711,649 B1 * | 3/2004 | Bachmat | G06F 3/061 710/18 |
| 6,738,933 B2 | 5/2004 | Fraenkel et al. | |
| 6,792,393 B1 | 9/2004 | Farel et al. | |
| 6,817,010 B2 | 11/2004 | Aizenbud-Reshef et al. | |

(Continued)

OTHER PUBLICATIONS

Standard Deviation, http://web.archive.org/web/20090424175452/http://en.wikipedia.org/wiki/Standard_deviation, Apr. 24, 2009, pp. 1-5 and 16.*

(Continued)

*Primary Examiner* — Jennifer To
*Assistant Examiner* — Liang Li
(74) *Attorney, Agent, or Firm* — The Law Offices of Bradley J. Bereznak

(57) ABSTRACT

A method for real-time analysis of results from a load test performed on a target website includes calculating first-level aggregated test results within each of a plurality of load server instances that generate a load on the target website. The first-level aggregated test results are calculated from data points received by each of the load server instances from the target website. The first-level aggregated test results include a sum of the data points, a count of the number of the data points, a sum of squares of the data points, and an average of the data points. A standard deviation result (STDEV) is calculated and chart is generated on a display via a graphical user interface. The chart provides a visual representation of a performance metric for the load test based on the standard deviation result.

18 Claims, 13 Drawing Sheets

(56) References Cited

U.S. PATENT DOCUMENTS

| | | | |
|---|---|---|---|
| 6,898,556 B2 | 5/2005 | Smocha et al. | |
| 6,959,013 B1 | 10/2005 | Muller et al. | |
| 6,975,963 B2 | 12/2005 | Hamilton et al. | |
| 7,050,056 B2 | 5/2006 | Meyringer | |
| 7,133,805 B1* | 11/2006 | Dankenbring | G06F 11/3414 702/182 |
| 7,216,168 B2 | 5/2007 | Merriam | |
| 7,334,162 B1 | 2/2008 | Vakrat et al. | |
| 7,376,902 B2 | 5/2008 | Lueckhoff | |
| 7,464,121 B2 | 12/2008 | Barcia et al. | |
| 7,478,035 B1 | 1/2009 | Wrench et al. | |
| 7,548,875 B2 | 6/2009 | Mikkelsen et al. | |
| 7,587,638 B2* | 9/2009 | Shah et al. | 714/47.3 |
| 7,594,238 B2 | 9/2009 | Takahashi | |
| 7,607,169 B1 | 10/2009 | Njemanze et al. | |
| 7,630,862 B2* | 12/2009 | Glas et al. | 702/186 |
| 7,685,234 B2 | 3/2010 | Gottfried | |
| 7,689,455 B2 | 3/2010 | Fligler et al. | |
| 7,693,947 B2 | 4/2010 | Judge et al. | |
| 7,725,812 B1 | 5/2010 | Balkus et al. | |
| 7,743,128 B2 | 6/2010 | Mullarkey | |
| 7,757,175 B2 | 7/2010 | Miller | |
| 7,844,036 B2 | 11/2010 | Gardner et al. | |
| 8,015,327 B1 | 9/2011 | Zahavi et al. | |
| 8,166,458 B2 | 4/2012 | Li et al. | |
| 8,291,079 B1 | 10/2012 | Colton et al. | |
| 8,448,148 B1 | 5/2013 | Kolawa et al. | |
| 8,464,224 B2 | 6/2013 | Dulip et al. | |
| 8,479,122 B2 | 7/2013 | Hotelling et al. | |
| 8,583,777 B1 | 11/2013 | Boyle et al. | |
| 2002/0138226 A1* | 9/2002 | Doane | G06F 11/2294 702/119 |
| 2002/0147937 A1* | 10/2002 | Wolf | 714/4 |
| 2003/0074161 A1 | 4/2003 | Smocha et al. | |
| 2003/0074606 A1* | 4/2003 | Boker | 714/42 |
| 2003/0109951 A1 | 6/2003 | Hsiung et al. | |
| 2003/0195960 A1 | 10/2003 | Merriam | |
| 2004/0010584 A1 | 1/2004 | Peterson et al. | |
| 2004/0039550 A1 | 2/2004 | Myers | |
| 2004/0059544 A1* | 3/2004 | Smocha et al. | 702/182 |
| 2004/0064293 A1 | 4/2004 | Hamilton et al. | |
| 2004/0119713 A1 | 6/2004 | Meyringer | |
| 2004/0205724 A1 | 10/2004 | Mayberry | |
| 2005/0102318 A1 | 5/2005 | Odhner et al. | |
| 2005/0182589 A1 | 8/2005 | Smocha et al. | |
| 2005/0216234 A1 | 9/2005 | Glas et al. | |
| 2005/0278458 A1 | 12/2005 | Berger et al. | |
| 2006/0031209 A1 | 2/2006 | Ahlberg et al. | |
| 2006/0075094 A1 | 4/2006 | Wen et al. | |
| 2006/0229931 A1 | 10/2006 | Fligler et al. | |
| 2006/0265353 A1* | 11/2006 | Garg | G06F 11/3495 |
| 2006/0271700 A1 | 11/2006 | Kawai et al. | |
| 2007/0143306 A1 | 6/2007 | Yang | |
| 2007/0232237 A1 | 10/2007 | Croak et al. | |
| 2007/0282567 A1 | 12/2007 | Dawson et al. | |
| 2007/0283282 A1 | 12/2007 | Bonfiglio et al. | |
| 2008/0059947 A1 | 3/2008 | Anand et al. | |
| 2008/0066009 A1 | 3/2008 | Gardner et al. | |
| 2008/0147462 A1 | 6/2008 | Muller | |
| 2008/0189408 A1 | 8/2008 | Cancel et al. | |
| 2008/0222653 A1* | 9/2008 | Aaronson | G06F 11/3476 719/318 |
| 2009/0077107 A1 | 3/2009 | Scumniotales et al. | |
| 2009/0271152 A1 | 10/2009 | Barrett | |
| 2009/0300423 A1 | 12/2009 | Ferris | |
| 2010/0023867 A1 | 1/2010 | Coldiron et al. | |
| 2010/0057935 A1 | 3/2010 | Kawai et al. | |
| 2010/0115496 A1 | 5/2010 | Amichai | |
| 2010/0198960 A1 | 8/2010 | Kirschnick et al. | |
| 2010/0250732 A1 | 9/2010 | Bucknell | |
| 2010/0251128 A1* | 9/2010 | Cordasco | 715/736 |
| 2010/0333072 A1 | 12/2010 | Dulip et al. | |
| 2011/0066892 A1 | 3/2011 | Gardner et al. | |
| 2011/0119370 A1 | 5/2011 | Huang et al. | |
| 2011/0130205 A1 | 6/2011 | Cho et al. | |
| 2011/0202517 A1 | 8/2011 | Reddy et al. | |
| 2011/0282642 A1* | 11/2011 | Kruger et al. | 703/27 |
| 2012/0017210 A1 | 1/2012 | Huggins et al. | |
| 2012/0023429 A1 | 1/2012 | Medhi | |
| 2012/0101799 A1 | 4/2012 | Fernandes | |
| 2012/0314616 A1 | 12/2012 | Hong et al. | |
| 2013/0031449 A1 | 1/2013 | Griffiths et al. | |
| 2013/0116976 A1* | 5/2013 | Kanemasa et al. | 702/186 |

OTHER PUBLICATIONS

Dillenseger, Bruno. "Clif, a framework based on fractal for flexible, distributed load testing." annals of telecommunications-annales des télécommunications 64.1-2 (2009): 101-120.*

"Algorithms for calculating variance." Wikipedia, The Free Encyclopedia. Wikimedia Foundation, Inc. Apr. 17, 2010. Web. <http://web.archive.org/web/20100417073246/http://en.wikipedia.org/wiki/Algorithms_for_calculating_variance>.*

DeMaio, Joe. "Chapter 6: Confidence Intervals". Jan. 25, 2010. Web. <http://web.archive.org/web/20100125133237/http://science.kennesaw.edu/~jdemaio/1107/Chap6.htm>.*

France Telecom SA. "CLIFv2 user maual". May 17, 2010. Web. <http://web.archive.org/web/20100716200625/http://clif.ow2.org/doc/user_manual/manual/UserManual.pdf>.*

Chester et al., "Mastering Excel 97", 1994, Sybex, 4th Ed., pp. 1016, 136-137, 430, 911, 957-958.

Malan et al. "An Extensible Probe Architecture for Network Protocol Performance Measurement", IEEE, Oct. 1998, pp. 215-227.

Jamin et al. "A Measurement-Based Admission Control Algorithm for Integrated Service Packet Networks", IEEE, 1997, pp. 56-70.

* cited by examiner $$STDEV = \sqrt{\frac{(x_1-a)^2 + (x_2-a)^2 + \ldots + (x_n-a)^2}{n}} \quad \leftarrow 61$$

$$= \sqrt{\frac{\underbrace{x_1^2 + x_2^2 + \ldots + x_n^2}_{63} + na^2 - 2a\underbrace{(x_1 + x_2 + \ldots + x_n)}_{64}}{n}} \quad \leftarrow 62$$

$$\left.\begin{array}{l} X = \text{CONFIDENCE INTERVAL} \\ \\ = \text{AVERAGE} + Z * \text{STDEV} \\ \\ = \left(\dfrac{x_1 + x_2 + \ldots + x_n}{n}\right) + Z * \text{STDEV} \end{array}\right\} 65$$

FIG. 6

| Collection Analysis | | | |
|---|---|---|---|
| Component Hierarchy | Collections Completed | Avg Duration | Min Duration |
| ▽ 🗎 Composition | 1,300 | 3.693 s | 0.726 |
| 🔲 Group1 | 100 | 2.331 s | 1.068 |
| 🔲 Transaction1 | 500 | 2.773 s | 0.756 |
| 🔲 Message7 | 100 | 1.744 s | 0.900 |
| 🔲 Message9 | 100 | 2.275 s | 1.134 |
| 🔲 Transaction2 | 200 | 6.948 s | 1.938 |
| 🔲 Transaction3 | 100 | 6.205 s | 3.231 |
| 🔲 Transaction4 | 100 | 6.151 s | 2.801 |
| 🔲 Transaction6 | 100 | 1.537 s | 0.726 |

FIG. 12A

LOAD TEST CHARTS WITH STANDARD DEVIATION AND PERCENTILE STATISTICS

RELATED APPLICATIONS

This application is a continuation-in-part (CIP) application of Ser. No. 12/804,338 filed Jul. 19, 2010 entitled, "REAL-TIME, MULTI-TIER, LOAD TEST RESULTS DATA", which is assigned to the assignee of the present CIP application.

TECHNICAL FIELD

The present disclosure relates generally to cloud computing; more particularly, to automated systems and methods for functional and/or load testing of websites or features of message-based, intranet, Internet, or browser-based applications.

BACKGROUND

Information technology is now routinely used by many enterprises to receive, process, and provide information via widely accessible electronic communications networks, such as the Internet. Yet most information technology systems will begin to deny service, or fail to process message traffic efficiently, when communications traffic exceeds a processing capacity of the system. Such failures in communication can significantly impair the operations of an enterprise in many ways. Slower website performance is also known to cause users/visitors to leave the website sooner. Another consequence of poor performance is that the website may be downgraded in search engine results rankings.

In recent years, enterprises and developers have sought an easy and affordable way to use cloud computing as a way to load and performance test their web-based applications. Cloud computing gets its name from the fact that the machine, storage, and application resources exist on a "cloud" of servers. In cloud computing shared resources, software and information are provided on-demand, like a public utility, via the Internet. Cloud computing is closely related to grid computing, which refers to the concept of interconnecting networked computers such that processing power, memory and data storage are all community resources that authorized users can utilize for specific tasks.

Load testing a web-based application or website can involve simulating a very large number (e.g., up to or beyond 1,000,000) of virtual website users via Hypertext Transfer Protocol (HTTP) or HTTP Secure (HTTPS) message intercommunications with the target website. For very large tests, sending and aggregating the test results data generated from all of the load servers to a database available to a dashboard in real-time has been problematic. The huge overhead of receiving and processing a very large number of HTTP messages containing all of the requests and responses sent from each of the many load servers to the analytic servers responsible for analyzing the test results data can easily overwhelm the resources of the server. In addition, communications bottlenecks can occur wherein messages get queued, such that the test result's are no longer sent to the database in real-time, and therefore are not available in the dashboards in real-time.

In extreme cases, the load test servers can also back up, causing them to not generate the appropriate load on the customers' websites or web applications. Adding to the problem is the fact that some calculations, such as standard deviation, cannot easily be calculated at each server and then added up or totaled with the same calculations performed on other servers to form a unified result for the entire set of servers generating the load test.

BRIEF DESCRIPTION OF THE DRAWINGS

The present disclosure will be understood more fully from the detailed description that follows and from the accompanying drawings, which however, should not be taken to limit the invention to the specific embodiments shown, but are for explanation and understanding only.

FIG. 6 is a set of mathematical expressions useful for determining standard deviation and confidence interval for a given dataset.

FIGS. 12A & 12B are two parts of an example graphical user interface window that shows a collection analysis table with standard deviation and $90^{th}$ percentile calculations for a set of different components.

DETAILED DESCRIPTION

Figure 1:
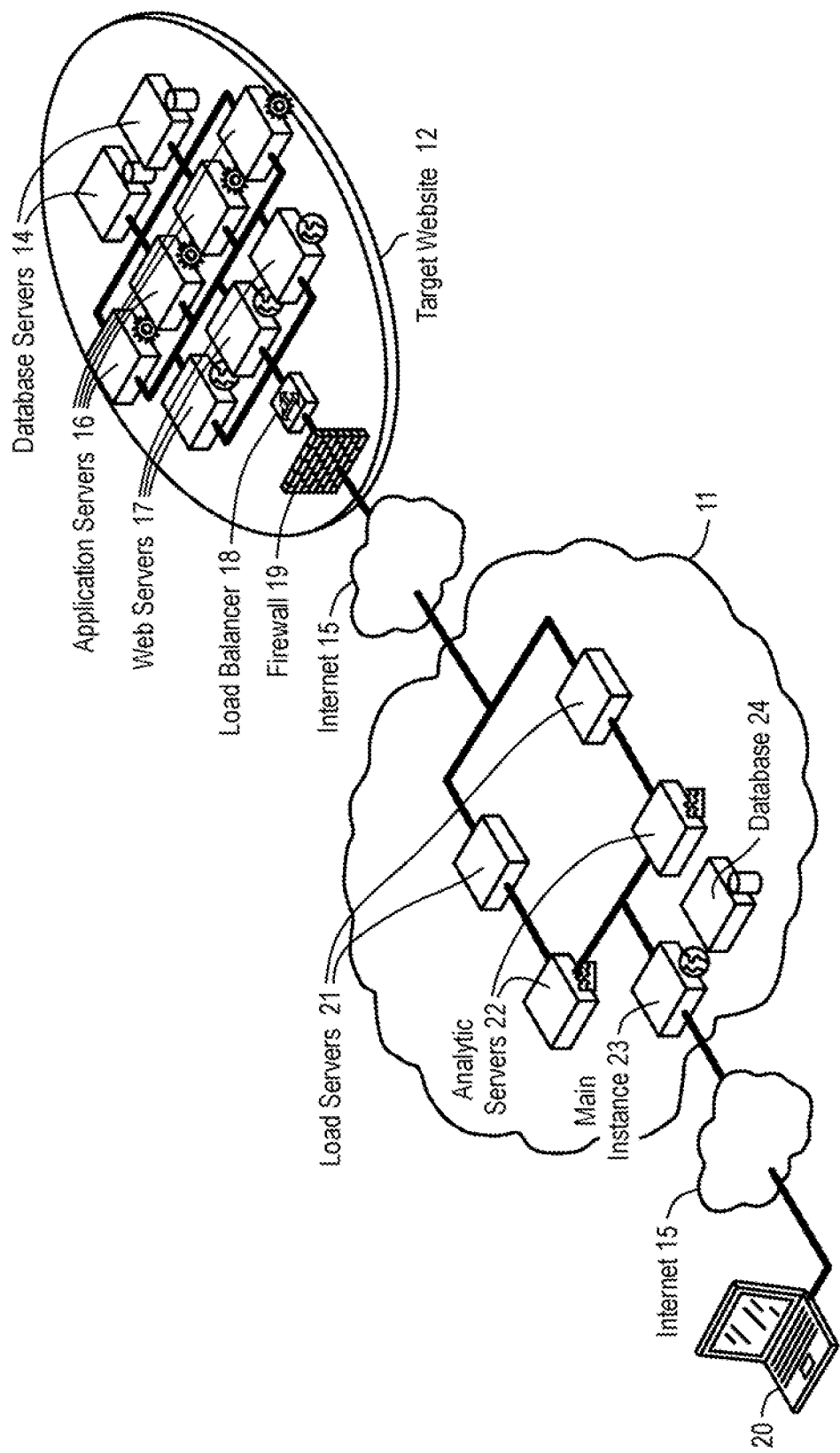
FIG. 1 illustrates an example high level architectural diagram of one stage of a CloudTest® provisioning process.

In the following description specific details are set forth, such as server types, cloud providers, structural features, process steps, etc., in order to provide a thorough understanding of the subject matter disclosed herein. However, persons having ordinary skill in the relevant arts will appreciate that these specific details may not be needed to practice the present invention. It should also be understood that the elements in the FIG.s are representational, and are not drawn to scale in the interest of clarity.

References throughout this description to "one embodiment", "an embodiment", "one example" or "an example" means that a particular feature, structure or characteristic described in connection with the embodiment or example is included in at least one embodiment. The phrases "in one embodiment", "in an embodiment", "one example" or "an example" in various places throughout this description are not necessarily all referring to the same embodiment or example. Furthermore, the particular features, structures or characteristics may be combined in any suitable combinations and/or sub-combinations in one or more embodiments or examples.

In the context of the present application, the term "cloud" broadly refers to a collection of machine instances, storage and/or network devices that work together in concert. A "public cloud" refers to a cloud that is publically available, i.e., provided by a cloud provider that a user may access via the Internet in order to allocate cloud resources for the purpose of utilizing or deploying software programs, and also for running or executing those programs thereon. Some public clouds deliver cloud infrastructure services or Infrastructure as a Service (IaaS). By way of example, Amazon Elastic Compute Cloud (also known as "EC2™") is a web service that allows users to rent computers on which to run their own computer applications, thereby allowing scalable deployment of applications through which a user can create a virtual machine (commonly known as an "instance") containing any software desired. The term "elastic" refers to the fact that user can create, launch, and terminate server instances as needed, paying by the hour for active servers.

Cloud platform services or "Platform as a Service (PaaS)" deliver a computing platform and/or solution stack as a service. An example PaaS cloud provider is the Google App Engine, which lets anyone build applications on Google's scalable infrastructure. Another leading software platform in the cloud provider is Microsoft Azure™, an application platform in the cloud that allows applications to be hosted and run at Microsoft datacenters.

A "private cloud" is a cloud that is not generally available to the public, and which is typically located behind a firewall of a business. Thus, a private cloud is only available as a platform for users of that business who are behind the firewall.

The term "server" broadly refers to any combination of hardware or software embodied in a computer (i.e., a machine "instance") designed to provide services to client devices or processes. A server therefore can refer to a computer that runs a server operating system from computer-executable code stored in a memory, and which is provided to the user as virtualized or non-virtualized server; it can also refer to any software or dedicated hardware capable of providing computing services.

A "message" generally refers to a unit of data that can be sent via an electronics communications network, e.g., the Internet, to another computational or communications system or device, e.g., to a server. By way of example, a message could represent a communication sent to a queuing system, a REST call, or a HTTP request. A message could also be instantiated entirely or partially as a single operation, such as a web service call in any one of a variety of forms, e.g., XML, JMS, HTML, JSON, etc. A "message clip" (or "clip" for short) comprises a set of one or more messages that includes a specification of the timing and/or dependencies within that set of messages. A clip typically comprises a plurality (e.g., hundreds of thousands) of sequenced messages that form part of a larger load test composition.

In the context of the present disclosure, "load" servers (also referred to as "Maestro" or "test" servers) are servers deployed and utilized primarily to generate a test load on a target website. That is, load servers play the test composition, generating a load on a target (customer) website and web applications. Load servers also function to report back results of the load test and statistics in real-time. "Analytic" or "result" servers are deployed and utilized primarily to collect the real-time test results from the load servers, aggregate those results, stream the results to real-time dashboards, and store them in a database.

The term "real-time" refers to a level of computer responsiveness that a user senses as sufficiently immediate or that enables the computer to keep up with some external process (for example, to present visualizations of load test results as it constantly changes). Thus, real-time is a mode of computer operation in which the computer collects data, analyzes or computes with the data, reports (e.g., visually displays) and/or stores the results nearly instantaneously, i.e., within seconds or milliseconds.

Run-time refers to the time during which a program is executing, or, in the case of a load test composition, when the composition is being played. In other words, when a user starts a program that runs on a processor-based system or computer, it is run-time for that program.

A "grid" or "test grid" refers to a collection of interconnected load servers and result servers that may be used to run a load test on a target website or web applications. As disclosed herein, a computer program or grid wizard may be utilized to automatically determine the global, cross-cloud, resources needed to execute a test by examining the test plan or script (also referred to as a test composition). Furthermore, the computer program can automatically allocate those server resources required for the test across multiple different cloud providers; verifies that the allocated servers are operational; and that the allocated servers are running proprietary load testing software or computer program product correctly. The computer program or product also monitors the allocated servers, replacing non-operational servers (when allocated, and during execution of the test) and displays results from multiple globally distributed clouds in a real-time streaming dashboard which requires no user initiated refresh.

In one embodiment, a method and system is provided for calculating load test aggregated test results at three architectural levels: first, at the load server level; second, at the analytics server level; and lastly at the system-wide data-store level. In a specific implementation, detailed level "raw" data (the content of a request sent to a website e.g., to access a homepage) is not sent from any of the load servers to any analytic server. Thus, system resources on the load server side are not wasted for the continual sending of raw data. Similarly, system resources on the analytics server side are conserved since the need to receive and process raw data sent from the load servers is obviated.

Instead of sending the raw data (web pages' responses and their statistics) obtained during a load test from each of the load servers to the analytic servers, a level of aggregation is added within each of the load servers. That is, in one embodiment, each load server includes an embedded component or client (referred to as a Results Service Client) that performs analytics server functions at the load server level. This Results Service Client aggregates test result data and generates various results statistics or metrics, e.g., average response time, average response size, etc., from the raw data that the load server received from the target website or application. The statistics computed by the Results Service Client in each of the load servers are then sent to their associated analytic server at periodic intervals (e.g., once every five seconds).

In another embodiment, the Results Service Client of each load server generates aggregates that include the sum of data elements obtained during a load test, the sum of squares of the data elements, a count of the number of data elements, and an average of the data elements. These aggregates are calculated at each of the load servers in real-time, and then passed down the Result Server hierarchy in a communicative manner. A specialized mathematical formula or algorithm is utilized by an automated computer program to calculate standard deviation for the load test results across a massively distributed dataset in real-time. A graphical user interface of an analytical dashboard allows a user to generate a graphical display (in the form of a widget or chart) of a selected percentile confidence interval using the standard deviation.

FIG. 1 illustrates an example high level architectural diagram of one stage of a CloudTest® provisioning process, which is the name given to the application program or grid wizard program described herein. As shown, a target website 12 includes a plurality of web servers 17 coupled to Internet cloud 15 through a load balancer 18 and a firewall 19. Web servers 17 are interconnected with a plurality of application servers 16 and a plurality of database servers 14.

Target website 12 is shown connected to a public cloud 11 via Internet cloud 15a. Public cloud 11 includes a main instance 23 coupled to a database 24. Database 24 may be used to store test results, store metadata indicative of the test definition, and to store monitoring data (e.g., CPU metrics) generated during the load test. Main instance 23 is also shown coupled to a pair of analytic servers 22 and a pair of load servers 21 within cloud 11, consistent with a snapshot view of the start of a process of deploying a test grid. It is appreciated that cloud 11 may comprise multiple clouds associated with multiple different cloud providers. In the example shown, main instance 23 is a virtual machine deployed on a server provided in cloud 11 that communicates with a browser application. In one embodiment, main instance 23 may include a results service (designated as a "reader" results service, as opposed to all of the other remote, "writer" results services) which reads data from database 24 and serves it to a web application, which in turn formats the data and serves it to an analytic dashboard in the browser. In operation, main instance 23 executes the coded sequence of computer executed steps (e.g., from code stored in a memory) that allocates the server resources required for the test across one or multiple different cloud providers. The same application that allocates/verifies server resources may also verify that the allocated servers are operational to conduct the website load test. The main instance may also execute code that implements the multi-tiered load test results aggregation steps disclosed herein.

Connected to the front-end of cloud 11 through Internet cloud 15 is a laptop computer 20 associated with a user who may orchestrate deployment of the test of target website 12. It is appreciated that other implementations, computer 20 may comprise a desktop computer, workstation, or other computing device that provides a user interface that allows a user to create and execute the test composition, define the parameters of the grid, initiate the load test, as well as analyze/review results of the test in real-time. The user interface may be web-based so it can be accessed from any computer having web-browser capabilities from any location in the world, without installation of specialized software.

Persons of skill in the art will understand that the software which implements main instance 23 may also be downloaded to the user's laptop computer 20 or implemented on a separate hardware appliance unit located either at the user's premises (e.g., behind the firewall) or anywhere in clouds 15 or 11. It is further appreciated that laptop 20 is representative of a-wide variety of computer devices, such as workstations, personal computers, distributed computer systems, etc., that may be utilized by the user to launch the method for provisioning/running the cross-CloudTest grid, analyzing streaming real-time results, as well as monitoring the performance of the actual load test.

Continuing with the example of FIG. 1, the application program running on main instance 23 operates to create a graphical user interface (GUI) that allows a user of laptop 20 to remotely interact with the application, view/monitor the test results in real-time, and modify parameters/test conditions dynamically during the actual test. (For purposes of the present disclosure, the grid wizard is considered synonymous with the application program or system program that performs the method and operations described herein.) In one embodiment, main instance 23 may include an embedded load server for running a relatively small load test that does not require the deployment of other load servers, and an embedded results (i.e., analytic) server for collecting/aggregating the real-time test results. In another embodiment, the main instance and the database provide a basic CloudTest environment that can be used to launch/establish one or more grids, with more or more cloud providers being utilized to provision each grid.

The overall testing process begins with the user creating a sophisticated test plan or composition via a GUI of either the same application program running on main instance 23 or a GUI associated with another web browser application. The GUI may be utilized that generate complex parallel message streams for website testing. In one example, the test plan may be created in the form of a visual message composition (analogous to a music composition) for testing and demonstrating web services, such as that described in U.S. patent application Ser. No. 11/503,580, filed Aug. 14, 2006, which application is herein incorporated by reference.

The process of deploying the test grid for a large-scale test may start with the user of laptop 20 indicating to main instance 23 the number of virtual users wanted on each track of the test composition. For example, the user of the system may wish test the target website with a load equal to 1000 users on each track of a test composition. The user may indicate the number of virtual users through an input entered on a browser page of the GUI (as described below), or, alternatively, invoke a grid wizard that automatically makes an intelligent allocation of the proper amount of resources needed to conduct the test, based on examining the composition that this grid will be running. By way of example, the system may determine that a single load server should be allocated to accommodate every 1000 virtual users.

Similarly, the system (via a grid wizard) may determine a proper allocation of result servers needed to accommodate the number of load servers specified. In one embodiment, users can specify how many load servers and how many result servers they want in each cloud and region. Alternatively, users may employ the grid wizard to specify all parameters. That is, users can simply specify a defined test composition, and the grid wizard automatically analyzes the composition and determines how many servers they need in each cloud and region. It is appreciated that the determination of the number of load servers and result servers is typically made based on considerations that ensure each virtual user has a satisfactory amount of bandwidth, CPU & memory resources, etc., such that it correctly simulates or behaves as a real-world browser.

Once the test has been defined and the parameters set (e.g., number of servers, server locations, etc.) via the grid wizard, upon user input, the user main instance 23 starts the process of actually deploying and allocating the specified resources by interacting with an application programming interface (API) of one or more cloud providers. By way of example, a user may click on a "Deploy Instances" button provided in a page of the CloudTest program GUI; in response, the system software contacts all of the different cloud APIs it needs and starts to allocate the required servers.

For example, if 1000 servers are to be allocated in EC2 there may be 40 simultaneous requests issued, each request being for 25 servers. If another 200 servers need to be allocated in Microsoft Azure in two different geographically-located data centers, two simultaneous requests may be issued, each for 100 servers in each data center (due to the fact that Azure does not support allocating smaller groups into one single deployment). In other words, the user may simply click on an icon button of a GUI to initiate the deployment/allocation of resources (e.g., machine instances) needed to execute the test composition, with the requests necessary to achieve that allocation being issued/handled in an automated manner, i.e., without user intervention.

FIG. 1 show the beginning of this process, wherein a first pair of load servers 21 and analytic servers 22 (also referred to as result servers or results services) have already been allocated and deployed on the grid.

Figure 2:
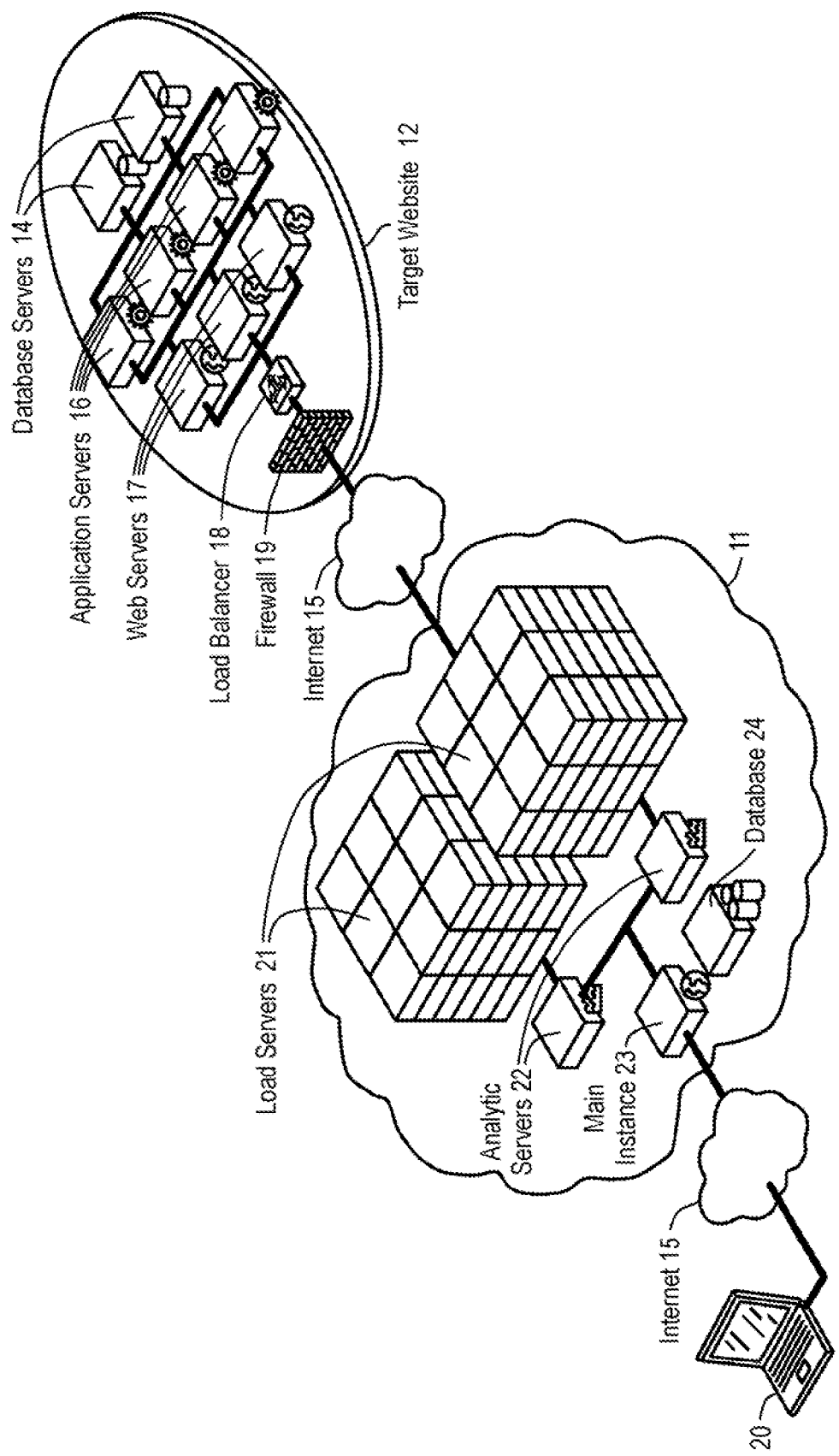
FIG. 2 illustrates an example high level architectural diagram of another stage of a CloudTest® provisioning process after the cross-cloud grid has been fully allocated and checked.

FIG. 2 illustrates an example high level architectural diagram of a later stage of a CloudTest test grid provisioning process, which may be after the cross-cloud grid has been fully allocated and checked. For reasons of clarity, an array of just fifty-four interconnected load servers 21 are shown allocated per each result server 22 in the example of FIG. 2. It is appreciated, however, that the system and method described herein is highly scalable and capable of deploying/allocating a massive amount of resources including hundreds or thousands of load servers as well as a corresponding portion or ratio of result servers, depending on the parameters specified by either the user or system prior to deployment of the grid. In one embodiment, a typical ratio of analytic (result) servers to load (maestro) servers is 1:50. As discussed previously, a grid—whether cross-cloud or single cloud—is a collection of load servers 21 and result servers 22, all of which (or a subset of) can be used to run a load test in concert.

Figure 3:
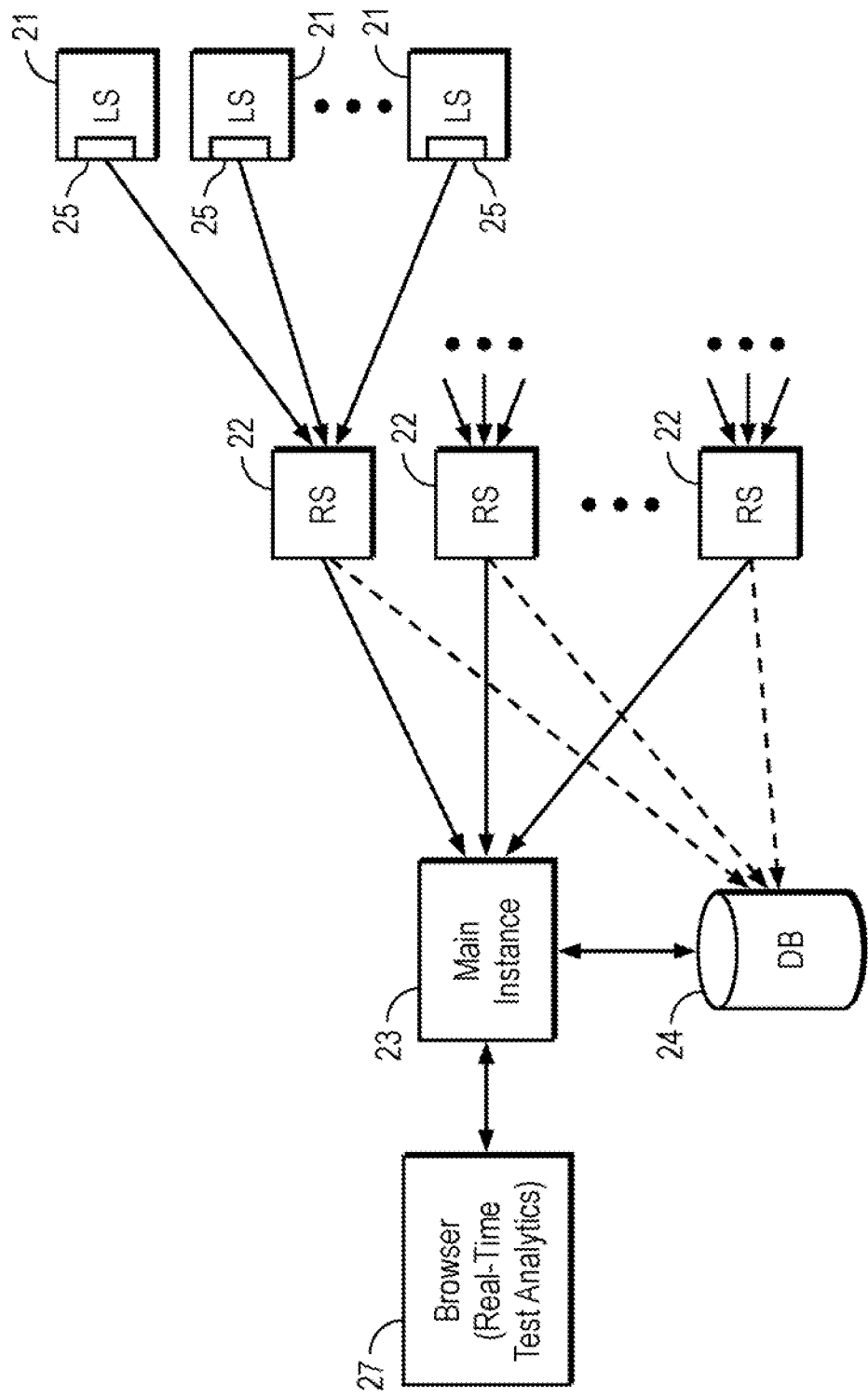
FIG. 3 is an example block high level architectural diagram that illustrates how, in real-time, load test results are aggregated at multiple different tiers or levels.

FIG. 3 is an example block high level architectural diagram that illustrates how, in real-time, load test results are aggregated at multiple different tiers or levels. As shown, block 27 represents a browser that provides real-time test analytics to a user (e.g., via laptop 20 shown in FIG. 1, or other computer device). Browser 27 is shown connected with main instance 23, which, in turn, is coupled with database 24. Database 24 provides system-level storage for aggregated test result data received from the Results Service servers 22. Database 24 receives aggregated test result data via a direct connection to each of the plurality of result servers 22.

Each of result servers 22 is connected to a plurality of associated load (Maestro) servers 21. Each load server 21 is shown having an embedded component or Result Service client 25, which computes metrics or statistics from the raw data (e.g., web pages) received from the target website or application. As discussed previously, the function of each load server 21 is to provide a load to the target website by creating one or more virtual users that access information on the target website. Within each Maestro server 21 is Result Service client 25 which functions to compute statistics such as average response time, average response size, and the like. In one embodiment, instead of sending all of the raw data received from the target website, Result Service client 25 computes relevant statistics and discards the data. Then, once an interval (e.g., every five seconds) the statistics computed by client 25 are sent to the associated result server 22.

Each of the result servers takes all of the statistics received from all of its associated load servers 21 and further aggregates those statistics. In other words, each result server 22 aggregates the aggregated results received from all of the load servers 21 that it is connected to. The resulting aggregated data is then further aggregated in database 24. Thus, statistics such as average response time across all of load servers 21 for the load test is stored in database 24 and available on a real-time basis to browser 27, via database queries performed by the main instance 23, which can perform further aggregation, grouping, filtering, etc.

Practitioners in the art will appreciate that the disclosed multi-tiered architecture does not overburden analytic servers 22 with excessive messaging of raw data. Furthermore, persons of skill will understand that aggregating statistical results data on multiple levels, beginning at the point closest to the actual load test results' creation, allows a user to view results in real-time on an analytic dashboard graphical user interface, thereby permitting real-time analysis across the entire testing infrastructure.

In a specific embodiment, each load server 21 includes an accumulator that stores the statistically aggregated data (e.g., average response time) computed on a second-by-second basis. Periodically (e.g., every 5 seconds), each load server 21 sends an appropriate number of messages (e.g., 5 messages, one for each second) to its associated result server 22. That is, one batched message is sent every 5 seconds—the batched message including data about all of the previous 5 seconds. Each message contains the data metrics computed every one second interval. These fine granularity metrics are then further aggregated in database 24. It is appreciated that by computing statistics/metrics on a second-by-second basis, the analytic dashboard running on browser 27 can analyze the results on various levels of granularity. In other words, the user may want to view statistical results of the load test on a minute-by-minute basis, or all the way down to a second-by-second basis. Thus, the architecture described herein allows a user to view real-time streaming results in an analytic dashboard of various performance metrics on a second-by-second basis, even when there are millions of virtual users on thousands of load servers.

Figure 4:
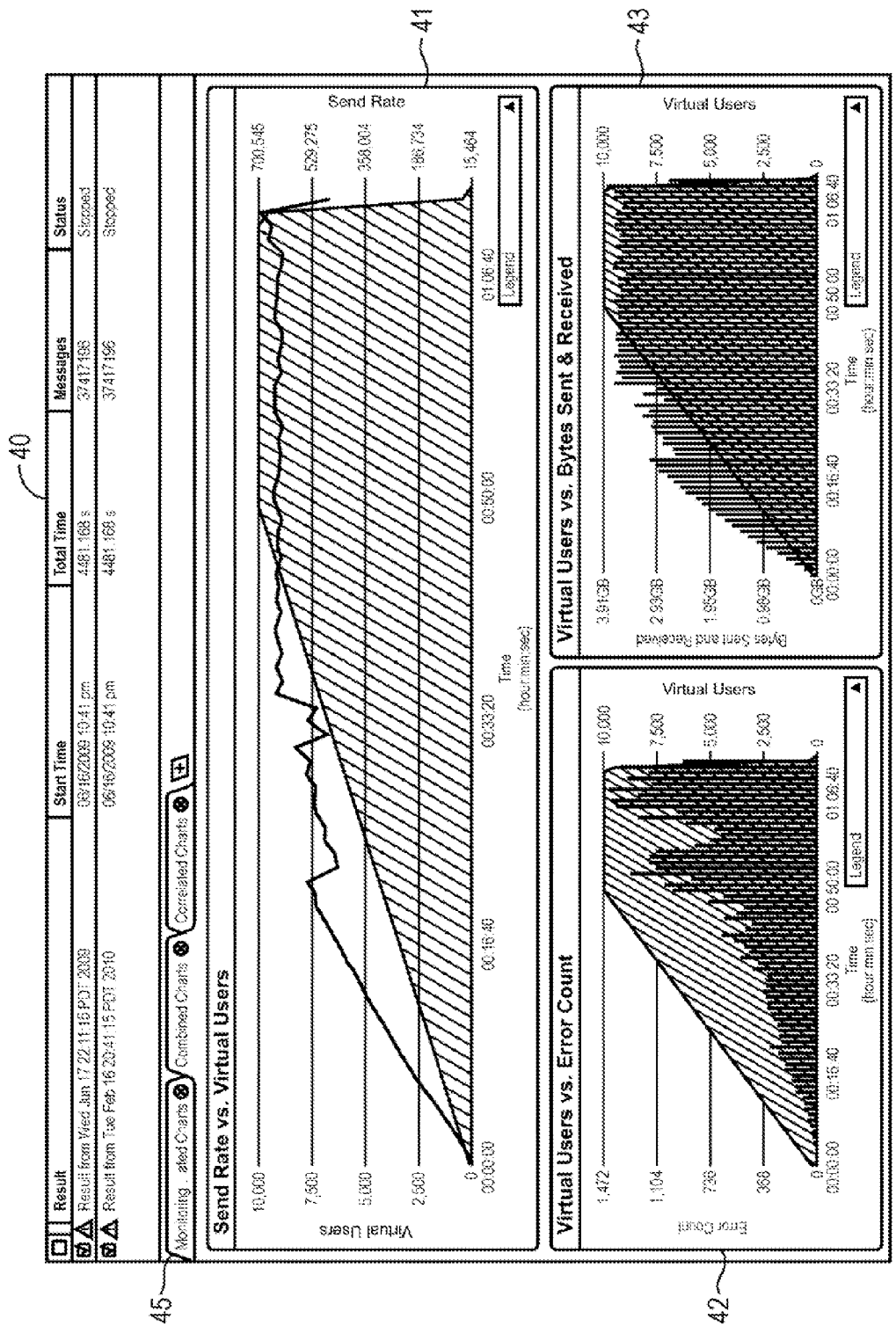
FIG. 4 illustrates an example graphical user interface window that shows real-time results of a test composition running on an example grid.

FIG. 4 illustrates an example graphical user interface window (also referred to as "widget') 40 that shows real-time results of a test composition running on an example grid. In other words, the analytic dashboard shown as widget 40 provides the user with visibility into the load that the test is creating on the grid server instances. (In the context of the present disclosure, a widget refers to a super class of charts—anything that a user might want to display graphically on a user interface. A widget can be a cross-set of results data, a set of charts, a list of data, or any combination/correlation of data displayed on the analytic dashboard.)

As can be seen, a set of combined charts are shown graphically in various window fields. For example, field 41 illustrates the number of virtual users (shaded area) and the send rate (heavy line) as a function of test time. Field 42 illustrates error count (vertical dark lines) and the number of virtual users (shaded area) versus test time. Field 43 shows the number of bytes sent and received (vertical dark lines) and the number of virtual users (shaded area) as a function of test time. It is appreciated that the user may select/view a wide variety of charts (combined, correlated, etc.) using tabs 45. Collectively, the charts provided in window 40 allow a user to view, analyze, and monitor test results and information in real-time so as to help identify root causes of performance problems their website or web application may be experiencing.

Persons of skill in the arts will appreciate that FIG. 4 shows how the entire test grid (comprising a huge number of interconnected load and result servers) works in concert to send load, receive responses, aggregate and analyze those responses into a real-time streaming graphical result displayed to the user. All this is accomplished regardless of how many server instances and different cloud providers are utilized to run the load test. Moreover, the various result charts may be viewed in one or many real-time streaming analytic dashboards. In each of the charts displayed on analytic dashboard window 40, the user may change the time format or legend of the horizontal axis for reporting the testing analytics in real-time on a varying time (e.g., hour-by-hour, minute-by-minute, or second-by-second) basis.

During the playback of the test composition and while the user is monitoring/viewing the test results displayed on GUI window 40, the user may pause or stop the test. Stopping the test closes the result and unloads the running test composition from all of the load servers. On the other hand, pausing or temporarily halting the test stops the load from all of the load servers, but keeps the test composition loaded and ready to resume playing into the same result. For instance, the user may pause the test after identifying a problem that requires adjustment of the load balancer on the target website.

It should be understood that when the test is temporarily halted in this manner, the grid remains fully provisioned and running. In other words, the composition and running of the load test is independent from the provisioning and running of the grid. After any adjustments or reconfiguration of the target website, the user may continue with the execution or playback of the test composition, either beginning at the place where it was halted, or re-starting the test from the beginning. Persons of skill in the art will appreciate that the ability to start/re-start the test without affecting the state of the grid, in conjunction with the ability to view test results metrics in real-time (e.g., second-by-second) provides a powerful advantage over prior art methods for testing a customer website, especially if the website is the production website. Owners of the website often want to know how the load applied from the load servers is affecting the experience of real users on the site, and appreciate the ability to stop the load test, pause the load test, or pause the ramp-up process (wherein more virtual users are added during the test) to make sure that real user behavior is not adversely affected by the load test.

Figure 5:
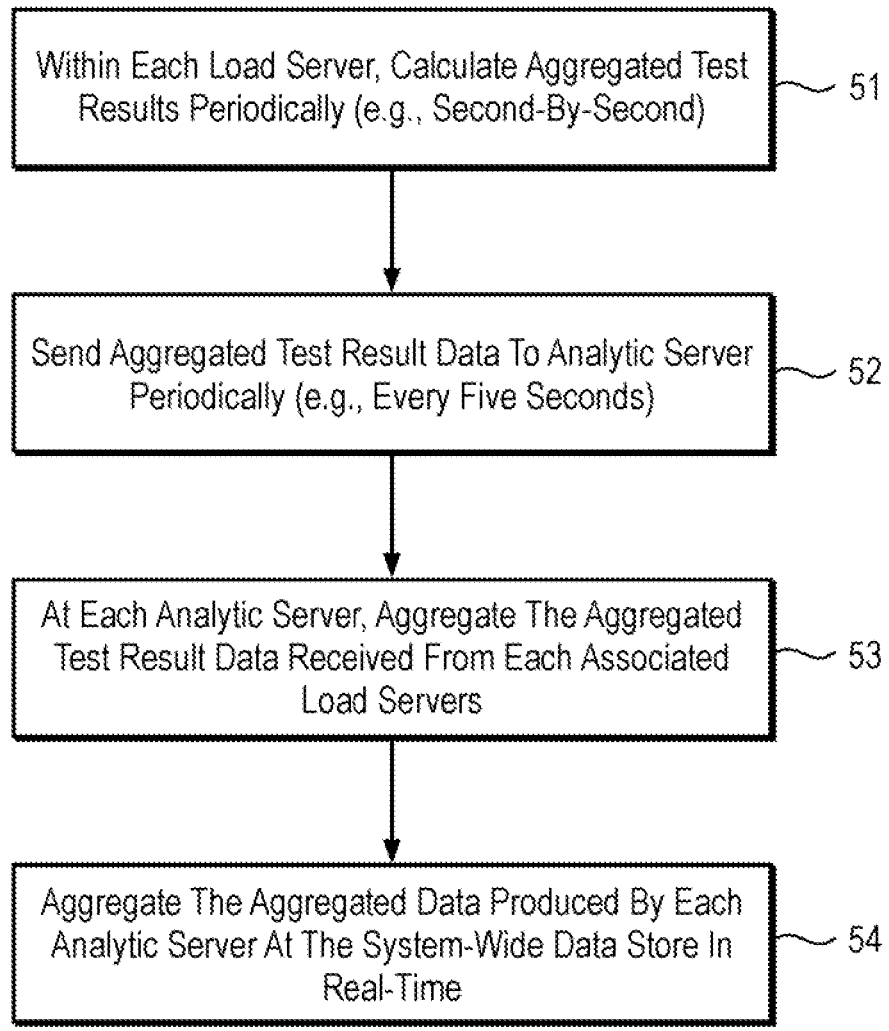
FIG. 5 is an example flow diagram of an automated sequence of steps for aggregating load test results at multiple different tiers or levels.

FIG. 5 is an example flow diagram of an automated sequence of steps for aggregating load test results at multiple different tiers or levels. The example method begins at a point where the load test grid is up and running, and the test composition is being executed on the target website. As the load test progresses, within each load server, a component or client periodically calculates or computes aggregated test results from the raw load test data generated from the target website (block 51). The raw data may comprise HTTP, Simple Object Access Protocol (SOAP) or other protocols messages' responses received from the target website, whereas the aggregated test results may comprise any statistic or metric of interest. The periodic interval that the aggregated test results are computed for may vary, but in a specific embodiment, results are computed every second.

The aggregated test results computed by the client running on each load server are periodically sent to their associated analytic server (block 52). The period at which the aggregated results are sent to the analytic servers may be equal to or greater than the period at which the aggregated test results are computed within each load server. In a typical implementation, aggregated test result data is computed by each load server every second, with the results of those computations being sent to the analytic servers from each of the load servers every five seconds.

Next, at each analytic server the aggregated test result data received from each of the associated load servers is further aggregated (block 53). In other words, each analytic server produces aggregated test result data across all of its associated load servers. For example, if each analytic server is associated (i.e., connected) with 50 load servers, each analytic server aggregates statistics/metrics across the aggregated test result data received from each of the 50 load servers.

Finally, at block 54, the aggregated statistical data produced by each analytic server is further aggregated at the system-wide data store in real-time. For instance, Structured Query Language (SQL) queries to the database can perform statistical functions (e.g., AVG, SUM, etc.) against tables' rows which have been inserted from the individual analytics servers, thereby producing further (third-level) aggregated results. As explained above, the results of this final level of aggregation is available in real-time to a browser executing an analytic dashboard that provides a graphical display of the results in various charts.

Real-Time Standard Deviation and Percentile Computations

In addition to aggregating test result statistics such as average response time in real-time, companies engaged in e-commerce are also interested in metrics such as percentile calculations. For example, businesses are very interested to know what a significant percentage (e.g., 90%) of their users experience in terms of average response time when they utilize a website or web application. This typically means discarding or throwing out anomalies or outlier test results and requires more sophisticated calculations be performed in real-time, such as standard deviation of a massively distributed dataset. In other words, a metric of particular interest may be a one-tailed distribution that tosses out 5-10% of the highest outliers (worst performance). Such a calculation is referred to as a percentile calculation or confidence interval, which requires the standard deviation for the dataset.

A method, apparatus and computer program product is provided to calculate standard deviation formula in real-time for a massively distributed dataset produced during a load test. The standard deviation calculation is made possible through the calculation of a number of aggregates or metrics in the load servers. In other words, the disclosed subject matter makes it possible to aggregate across all of the servers and calculate standard deviation across a massively distributed dataset in real time. Once that is done it is also possible to calculate any confidence interval percentiles based on the calculated standard deviation for the entire dataset.

In one embodiment, the problem of calculating standard deviation and confidence interval percentiles that typically require aggregations across a massively distributed dataset in real-time is solved by aggregating data test results at each load server for all of the virtual users that it hosts; then at the analytic servers for all of the load servers each supports, and finally in the system wide data store for all of the results or analytic servers.

In one implementation, an automated software tool provides a graphical user interface that allows a user to automatically calculate metrics such as percentile and standard deviation in real-time from aggregated load test results. Utilizing the software program, a user, for example, may calculate a one-tailed confidence interval, meaning that the outliers are removed to obtain the $90^{th}$ (or $95^{th}$, or $98^{th}$, etc.) percentile for average response time of a website.

FIG. 6 illustrates a general equation 61 for calculating standard deviation, where standard deviation (STDEV) is equal to the square root of the sum of the squares of the geometric distance of the individual data points from the mean divided by the sample size or count. In equation 61, the average (AVERAGE) is represented as "a", the count (COUNT), or number of test result data points, is shown as "n", and each of the data points as "$x_i$", where "i" is an integer ranging from one to n. Persons of skill in the art will appreciate the standard deviation, as represented in equation 61, is not something that is easily calculated in real-time for massively distributed dataset. One reason why is because to do so ordinarily requires having all of the individual data points ("$X_i$") of the metric in one data store.

As discussed previously, in one embodiment an embedded component or client (i.e., a Results Service Client) performs analytics server functions at the load server level. The Results Service Client aggregates test result data and generates various results statistics or metrics, e.g., average response time, average response size, etc., from the raw data that the load server received from the target website or application. In other words, the Results Service Client runs inside each load server to calculate the metric AVERAGE, which is then passed down the result server hierarchy (see FIG. 3) to obtain a cumulative average (i.e., an average of all averages) across the entire dataset.

The inventors have discovered that the general standard deviation equation 61 may be expanded, and the terms rearranged, resulting in the mathematically equivalent standard deviation equation or formula 62. Formula 62 includes a sum of the squares of the test result data points (SUM_OF_SQUARES) term 63 and a simple sum of the data points (SUM) term 64, as well as AVERAGE and COUNT aggregates. In one embodiment, the Results Service Client in each load server calculates the SUM, SUM_OF_SQUARES, COUNT and AVERAGE aggregates in real-time. These first-level aggregated test results are then aggregated down the Results Server hierarchy in the same manner as described in connection with FIG. 3. Utilizing formula 62, STDEV can be calculated from the entire dataset when first launching an analytic dashboard that provides a graphical display of the results in various charts, as well as after load testing has been completed. That is, as a load test composition is running, the load servers collect test result data points received from the website or web application. The Results Service Client running in each load server calculates the above first-level aggregated test results in real-time, with the calculations being sent to the associated Result Servers. The Results Servers then aggregate the aggregates received from the load servers and forward the results down to the main instance and database.

Persons of skill in the art will appreciate that formula 62 also works for calculating STDEV based on incremental or delta changes when the load test is running live, in real-time. To calculate standard deviation basement of the changes, the delta SUM_OF_SQUARES aggregate is added to the SUM_OF_SQUARES, and the delta SUM is added to the SUM. The new COUNT and new cumulative AVERAGE metrics are also calculated at each of the load servers and passed down their associated Result Servers. To produce the final result of the total aggregated standard deviation, all of the aggregated terms or results that were calculated from all of the results servers are added up as shown in the nominator of formula 62. The number of observations or count is the denominator. A square root of this fraction is the standard deviation result across the entire dataset.

Once the standard deviation has been calculated, a confidence interval, "X", may be determined, as shown by the set of equivalent equations 65 shown in FIG. 6. By way of example, the confidence interval X may be calculated to determine what will be the average response time of 90%, 95%, or 98% of the users of a particular website or web application. As shown in FIG. 6, the confidence interval X is calculated as the AVERAGE+(Z*STDEV), where Z is a value obtained from a known statistics table used for calculating a certain percentile (e.g., 90%, 95%, or 98%).

The Z value is well-known in statistics as the result of a translation from a normally-distributed variable. The Z value is thus a constant that may determined from a look-up to a standard statistical table such as that provided at <http://www.statsoft.com/textbook/distribution-tables/#z>. Through the translation into a standard normal variable, table can be used to calculate percentiles, i.e., using a so-called "Z-table". For instance, the respective Z values for two-tailed confidence intervals for $90^{th}$, $95^{th}$ and $98^{th}$ percentiles are 1.65, 1.96, and 2.33. The Z values for one-tailed confidence intervals for $90^{th}$, $95^{th}$ and $98^{th}$ percentiles are 1.29, 1.65, and 2.06, respectively. So, by way of example, if the AVERAGE webpage response time is, say, 5 seconds, and the STDEV is 2 seconds, the $90^{th}$ percentile confidence interval X (one-tailed) is 7.58 (=AVERAGE+(Z*STDEV)).

To summarize, the SUM, SUM_OF_SQUARES, COUNT and AVERAGE aggregates are calculated at each of the load servers in real-time, which aggregates are passed down the Result Server hierarchy to be further aggregated for the entire dataset produced during the load test in a communicative manner. The CloudTest application software program uses these aggregates and formulas 62 and 65 to generate a graphical display (in the form of a widget or chart) of the selected percentile confidence interval. The application program is configured to generate a graphical user interface that allows a user to select a certain percentile (e.g., 90% of average response time) of the load test results in real-time. In addition, as the percentile widget is running in real-time, the user allows the user to change or modify the percentile (e.g., change from a one-tailed to a two-tailed distribution, or from 90% to 95%), with the new results being produced on an analytic dashboard or chart in real-time.

Figure 7:
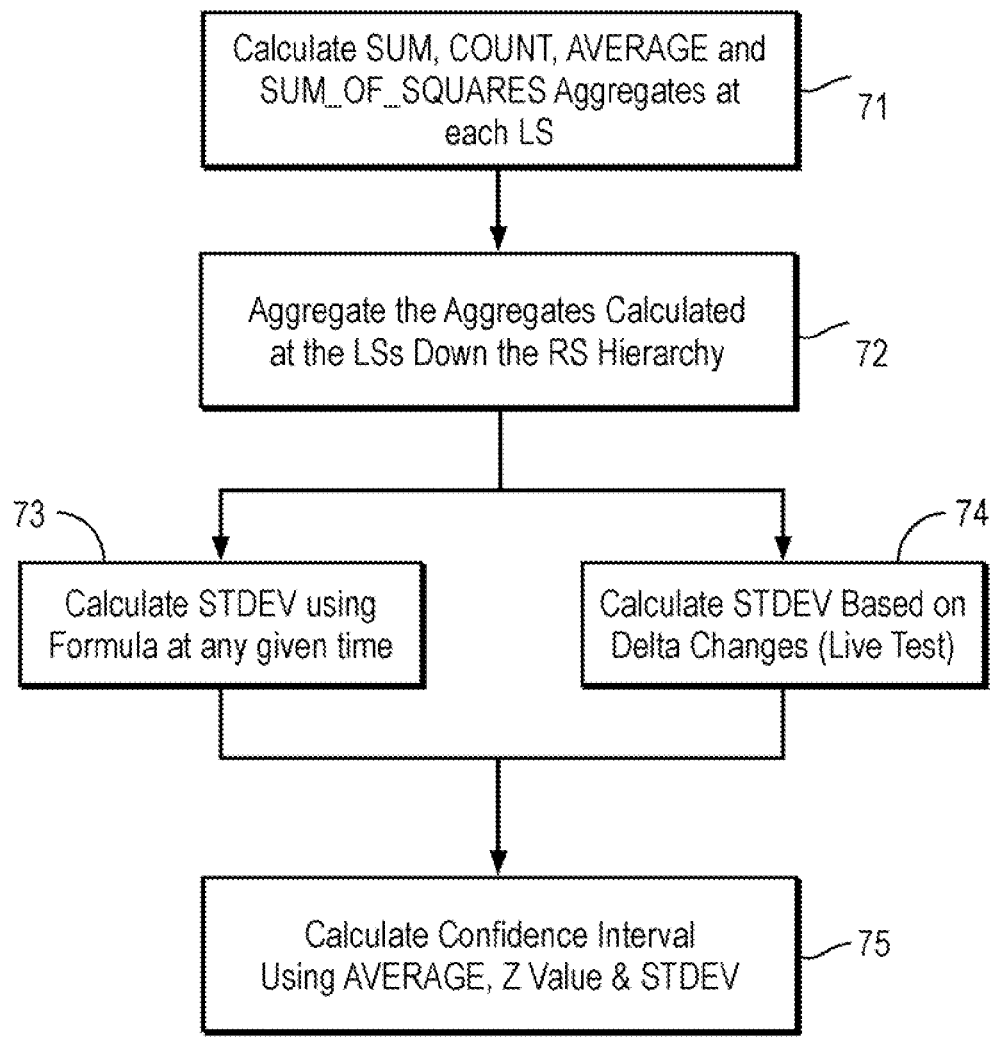
FIG. 7 is an example flow diagram of an automated sequence of steps for aggregating load test results at multiple different tiers or levels to calculate standard deviation and confidence interval.

FIG. 7 is an example flow diagram of an automated sequence of steps for aggregating load test results at multiple different tiers or levels to calculate standard deviation and confidence interval. The process begins in block 71 with the calculation of the SUM, SUM_OF_SQUARES, COUNT and AVERAGE aggregates at each of the load servers. Next, each of these aggregates are further aggregated at each of the Result Servers associated with their respective load servers. That is, the aggregates collected at the Load Servers are aggregated down the Result Server hierarchy (block 72). Standard deviation may then be calculated from the aggregates in the manner described above. Standard deviation may be calculated from formula 62 at any given time during or after the load test (block 73), or live, in real-time based on delta changes in the aggregates (block 74). Once STDEV has been calculated, a confidence interval X may be calculated, i.e., using AVERAGE, Z value, and STDEV (block 75).

Figure 8:
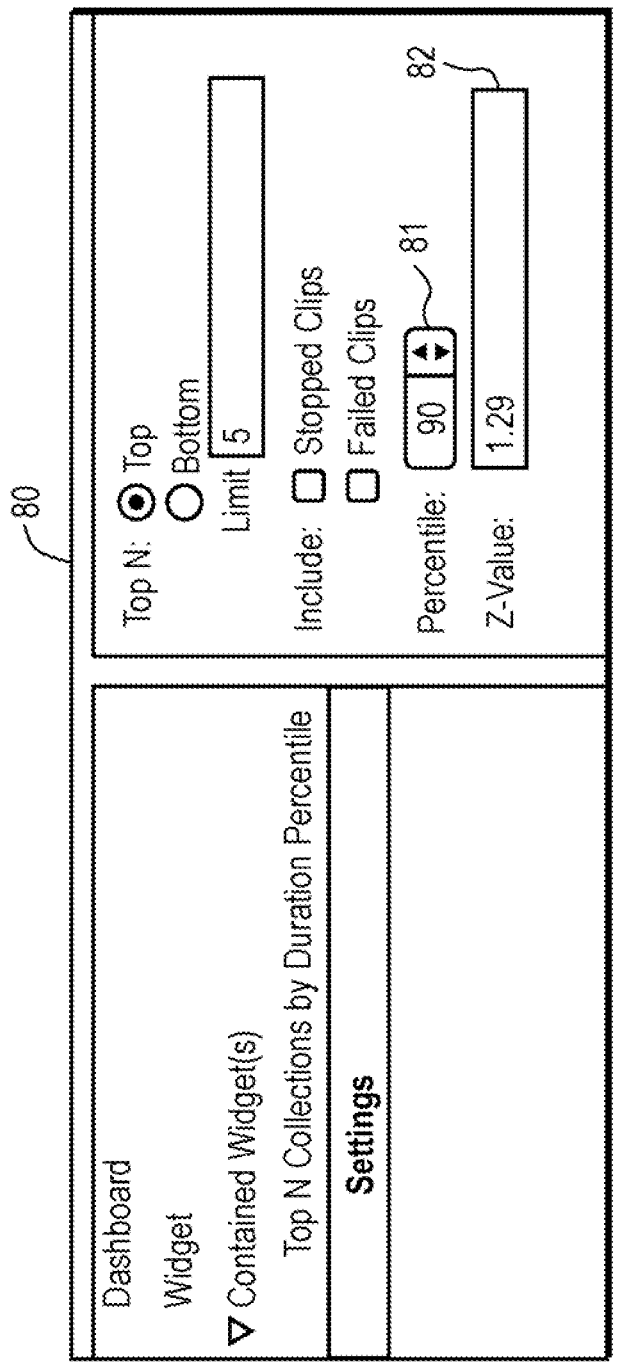
FIG. 8 is an example graphical user interface window that allows a user to select a certain percentile chart.

FIG. 8 is an example window 80 of the CloudTest application program GUI according to one embodiment that allows a user to select a certain percentile chart from among a set of default percentile values (e.g., 90%, 95%, or 98%). That is, the CloudTest application program GUI provides collection charts for standard deviation and 90%, 95%, and 98% percentiles. The charts assume a normal distribution in calculations. Additionally, the application program calculates a one-tailed confidence interval, meaning that the outliers removed to obtain the 90th percentile are the slow response times but not the really fast ones. The GUI also provides the user with the option of calculating a two-tailed confidence interval.

As shown, for percentile charts, the user can select from among the default percentile values (e.g. 90%, 95%, or 98%) using up/down selection arrows 81. For each of the percentile selections, the corresponding Z-Value is shown in field 82. In one embodiment, a new Z-value can be entered manually in field 82 for any of the drop-down percentile values. Selection of a new percentile results in a reset, wherein the default z-values for each of the percentiles appear in field 82. In the example window 80 of FIG. 8 the user may select between the bottom or top N collections by duration percentile.

In one embodiment, standard deviation charges may include similar chart settings as described in connection with the collection-based chart of FIG. 8, with the option to include Stopped Collections or Failed Collections, which are not included by default.

Figure 9:
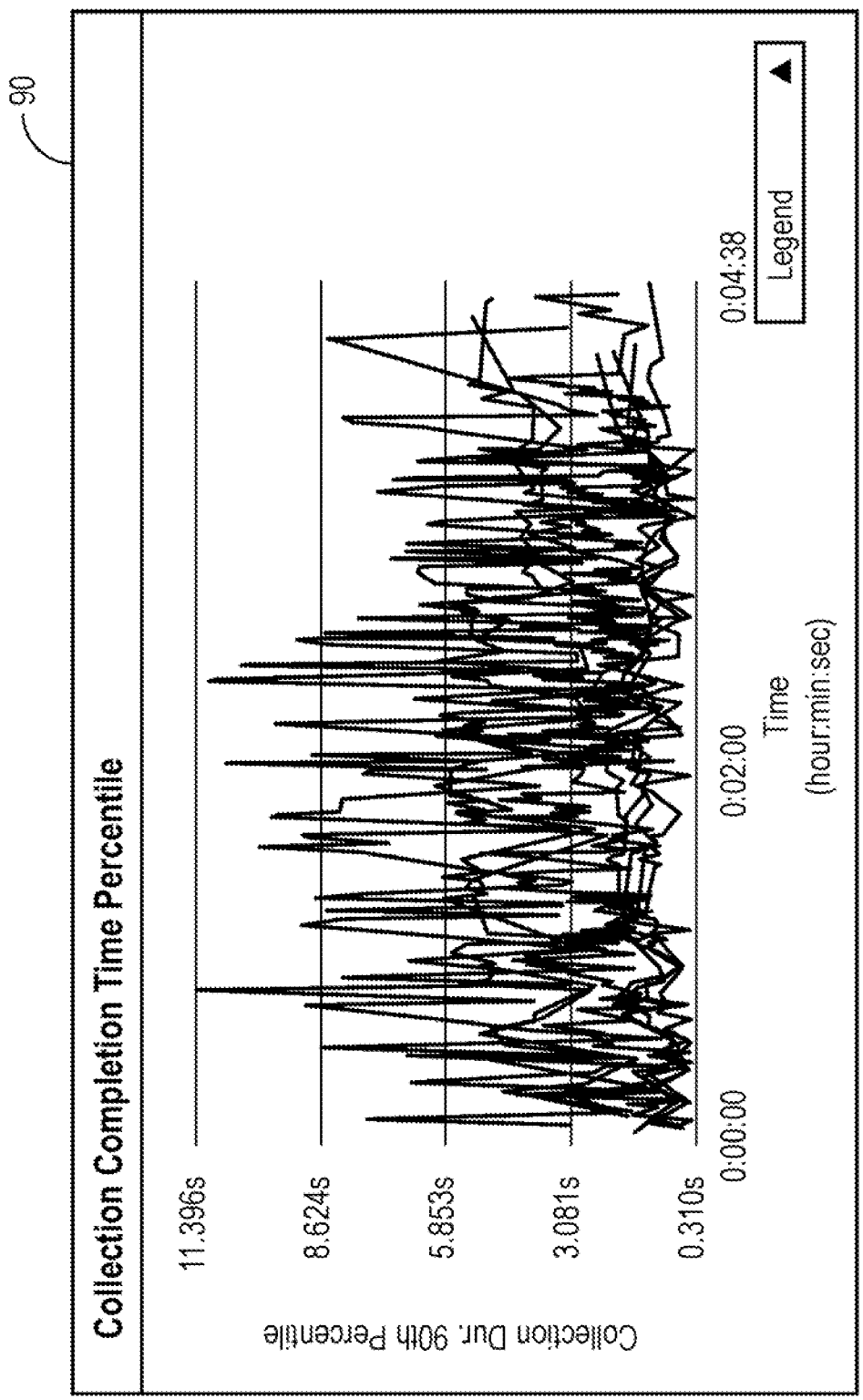
FIG. 9 is an example graphical user interface window that shows a collection completion time percentile chart.

FIG. 9 illustrates an example graphical user interface window 90 that shows a collection completion time percentile chart. The y-axis represents collection duration for a 90$^{th}$ percentile confidence interval, whereas the x-axis represents time. Thus, the chart shown in FIG. 9 plots the standard deviation of collection completion time for each load test time period, with a separate series being shown for each collection.

Figure 10:
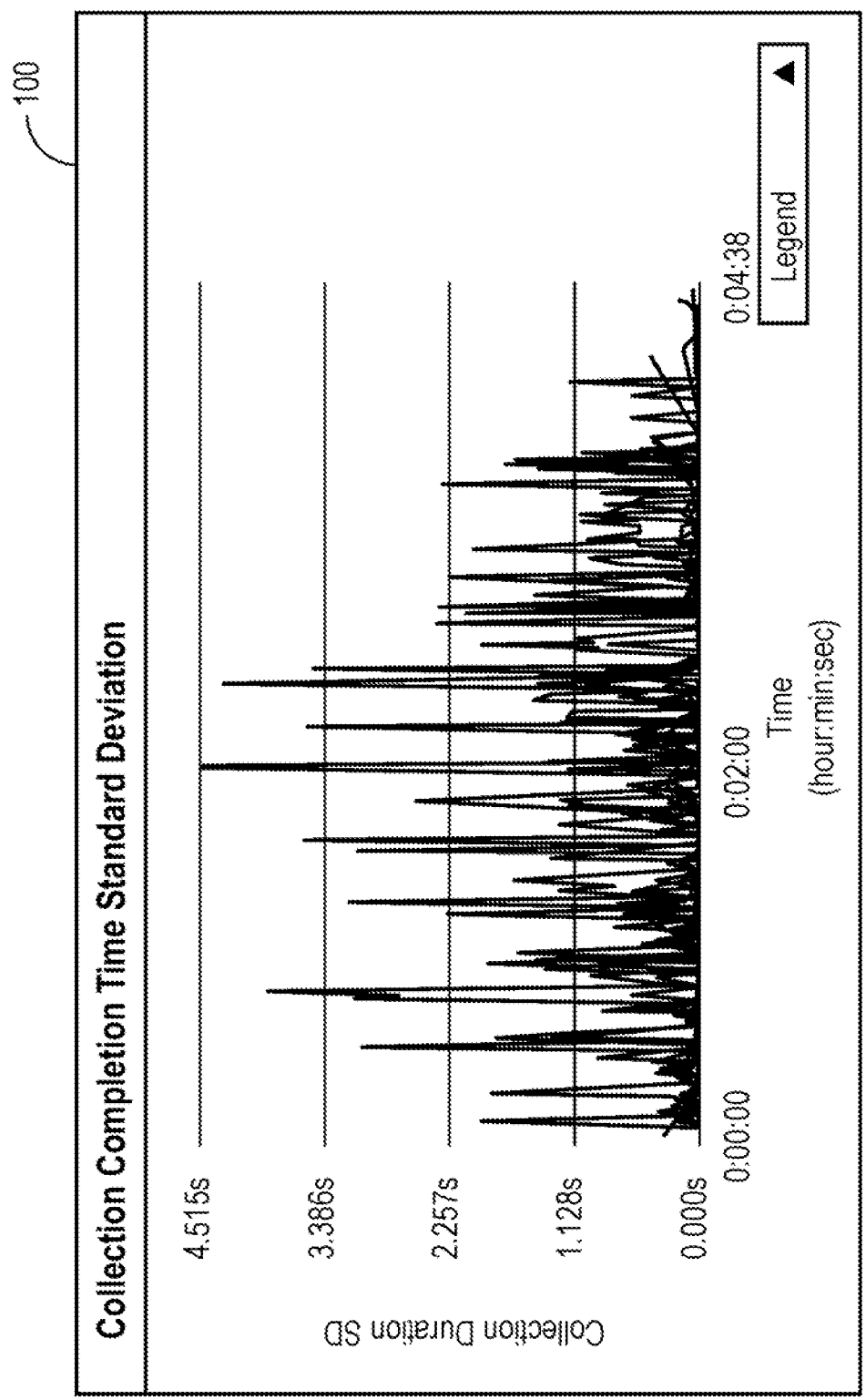
FIG. 10 is an example graphical user interface window that shows a collection completion time standard deviation chart.

FIG. 10 is an example graphical user interface window 100 that shows a collection completion time standard deviation chart in which the standard deviation of collection completion is plotted against test time.

Figure 11:
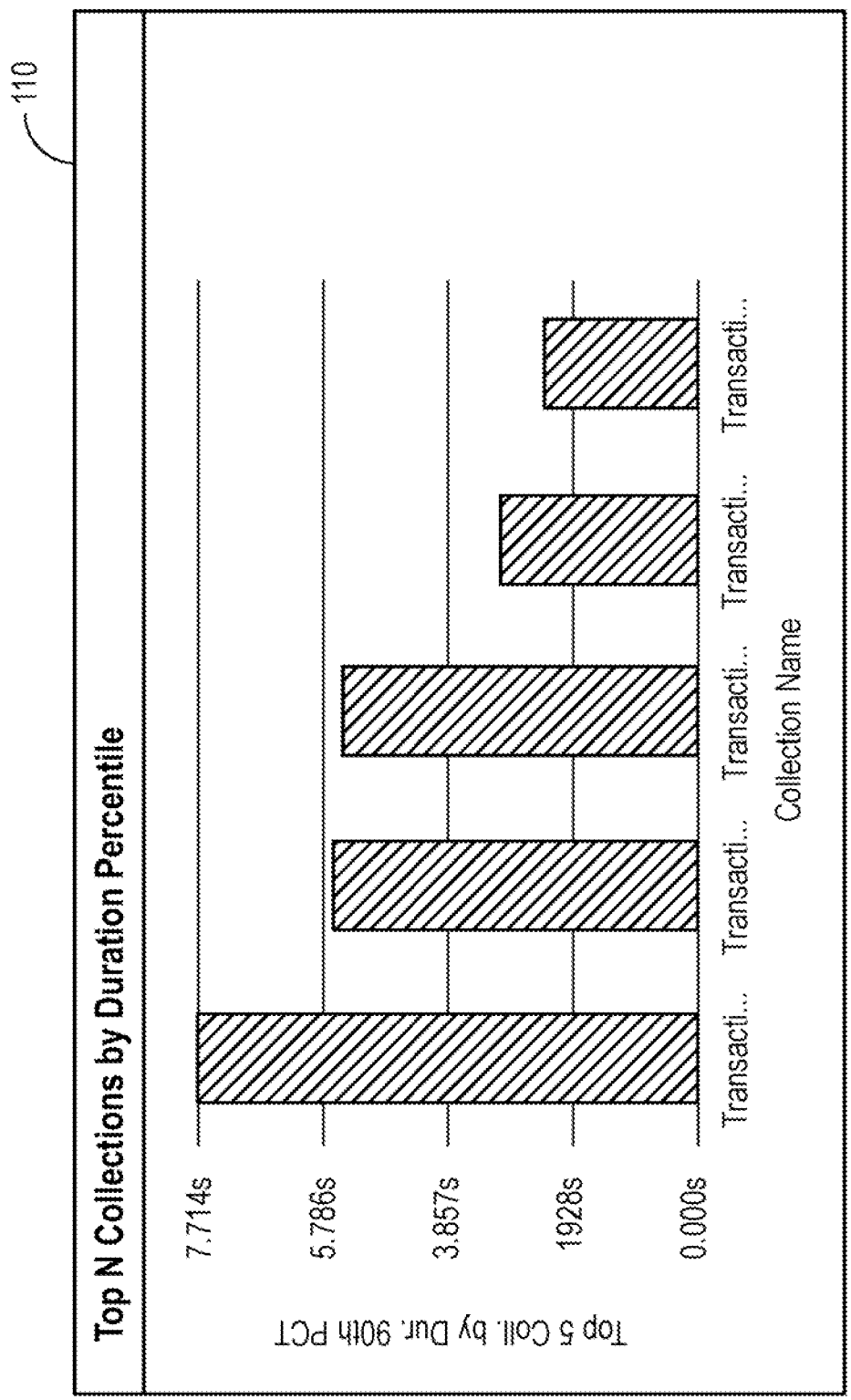
FIG. 11 is an example graphical user interface window that shows top N collections by duration percentile.

FIG. 11 is an example graphical user interface window 110 that shows top N collections by duration percentile. In this example, five is the default number shown for N.

Figure 12B:
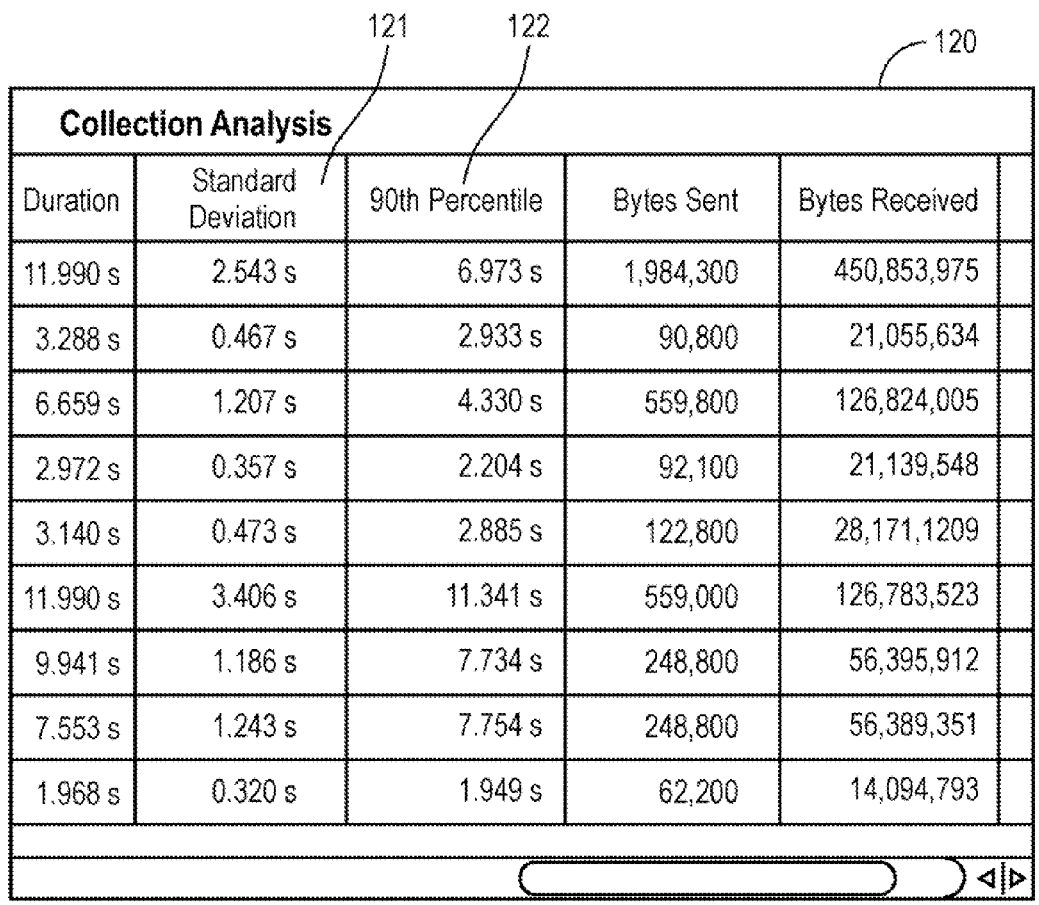

FIGS. 12A & 12B are the left-hand side and right-hand side, respectively, of an example graphical user interface window 120 that shows a collection analysis table with standard deviation and 90$^{th}$ percentile calculations for a set of different components. As shown in FIG. 12B, the collection analysis widget includes columns 121 and 122, respectively showing standard deviation and 90th percentile confidence interval for the components listed in each row.

It should be understood that elements of the disclosed subject matter may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A computer-implemented method for real-time analysis of results obtained from a load test as the load test is being performed on a target website, comprising:
   (a) computing first-level aggregated test results within each of a plurality of load server instances that generate a load on the target website, the first-level aggregated test results including first-level statistics computed from a set of data points received over a time period by each of the load server instances from the target website, the first-level statistics being computed by an embedded component within each of the load server instances, the first-level statistics including a sum of the data points, a count of the number of the data points, a sum of squares of the data points, and an average of the data points;
   (b) sending the first-level aggregated test results from each of the load server instances to an associated one of a plurality of analytic server instances;
   (c) aggregating, in one or more analytic server instances, all of the first-level aggregated test results computed by the load server instances resulting in second-level aggregated test results;
   (d) aggregating all of the second-level aggregated test results resulting in a cumulative sum, a total count, a total sum of squares, and a cumulative average, of all of the data points across an entire data set;
   (e) calculating a standard deviation result (STDEV) as $$STDEV = SQRT[\{(X_1^2+X_2^2+\ldots+X_N^2)+NA^2-2A(X_1+X_2+\ldots+X_N)\}/N];$$

where N is the total count, A is the cumulative average, $X_1, X_2 \ldots X_N$ are the data points across the entire data set, $(X_1^2+X_2^2+\ldots+X_N^2)$ is the total sum of squares, and $(X_1+X_2+\ldots+X_N)$ is the cumulative sum; and
   (f) generating a chart on a display via a graphical user interface, the chart providing a visual representation of a performance metric for the load test based on the standard deviation result,
   wherein steps (a)-(f) are each performed in real-time as the load test is being performed on the target website.

2. The computer-implemented method of claim 1 further comprising repeating steps (a)-(f) for a duration of the load test.

3. The computer-implemented method of claim 1 further comprising:
   storing the second-level aggregated test results in a data storage instance.

4. The computer-implemented method of claim 3 further comprising communicating the standard deviation result to a browser application, the browser application providing an analytic dashboard with the graphical user interface.

5. The computer-implemented method of claim 1 wherein the chart is generated in real-time responsive to an input command of the graphical user interface.

6. The computer-implemented method of claim 1 wherein the performance metric comprises a confidence interval percentile (X).

7. The computer-implemented method of claim 1 further comprising calculating the confidence interval percentile (X) as $$X = \{(A+(Z^*STDEV)\};$$

where Z is a constant used for calculating a certain percentile.

8. The computer-implemented method of claim 7 wherein the certain percentile comprises either a 90th percentile, a 95th percentile, or a 98th percentile.

9. The computer-implemented method of claim 1 further comprising calculating a delta STDEV based on incremental changes occurring as the load test is running in real-time.

10. A non-transitory computer-readable storage medium encoded with computer instructions, which, when executed by a computer processor, operable to:
   (a) compute first-level aggregated test results within each of a plurality of load server instances that generate a load on the target website, the first-level aggregated test results including first-level statistics computed from a set of data points received over a time period by each of the load server instances from the target website, the first-level statistics being computed by an embedded component within each of the load server instances, the first-level statistics including a sum of the data points, a count of the number of the data points, a sum of squares of the data points, and an average of the data points;
   (b) send the first-level aggregated test results from each of the load server instances to an associated one of a plurality of analytic server instances;

(c) aggregating, in one or more analytic server instances, all of the first-level aggregated test results computed by the load server instances resulting in second-level aggregated test results:

(d) aggregating all of the second-level aggregated test results resulting in a cumulative sum, a total count, a total sum of squares, and a cumulative average, of all of the data points across an entire data set;

(e) calculating a standard deviation result (STDEV) as $$STDEV = SQRT[\{(X_1^2 + X_2^2 + \ldots + X_N^2) + NA^2 - 2A(X_1 + X_2 + \ldots + X_N)\}/N];$$

where N is the total count, A is the cumulative average, $X_1, X_2 \ldots X_N$ are the data points across the entire data set, $(X_1^2 + X_2^2 + \ldots + X_N^2)$ is the total sum of squares, and $(X_1 + X_2 + \ldots + X_N)$ is the cumulative sum; and (f) generating a chart on a display via a graphical user interface, the chart providing a visual representation of a performance metric for the load test based on the standard deviation result, wherein steps (a)-(f) are each performed in real-time as the load test is being performed on the target website.

11. The non-transitory computer readable storage medium of claim 10 wherein execution of the computer instructions is further operable to repeat steps (a)-(f) for a duration of the test load.

12. The non-transitory computer-readable storage medium of claim 10 wherein execution of the computer instructions is further operable to:

store the second-level aggregated test results in a data storage instance.

13. The non-transitory computer-readable storage medium of claim 12 wherein execution of the computer instructions is further operable to communicate the standard deviation result to a browser application, the browser application providing an analytic dashboard with the graphical user interface.

14. The non-transitory computer-readable storage medium of claim 10 wherein the chart is generated in real-time responsive to an input command of the graphical user interface.

15. The non-transitory computer-readable storage medium of claim 10 wherein the performance metric comprises a confidence interval percentile (X).

16. The non-transitory computer-readable storage medium of claim 10 wherein execution of the computer instructions is further operable to calculate the confidence interval percentile (X) as $$X = \{(A + (Z*STDEV)\};$$

where Z is a constant used for calculating a certain percentile.

17. The non-transitory computer-readable storage medium of claim 16 wherein the certain percentile comprises either a 90th percentile, a 95th percentile, or a 98th percentile.

18. The non-transitory computer-readable storage medium of claim 10 wherein execution of the computer instructions is further operable to calculate a delta STDEV based on incremental changes occurring as the load test is running in real-time.

* * * * *